April 18, 1933.  H. S. WRIGHT  1,904,340
PIPE TRAP COVER
Filed Dec. 5, 1931
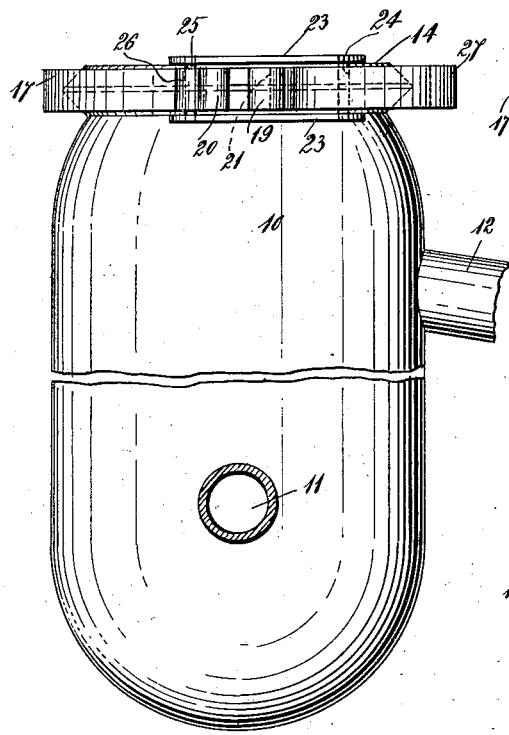
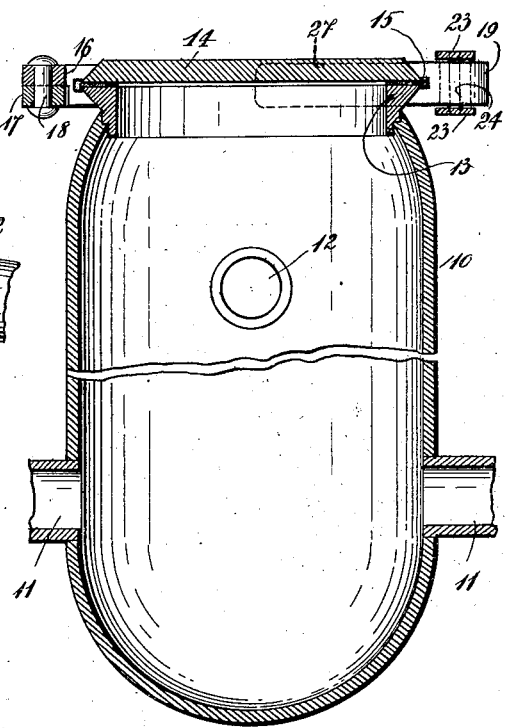
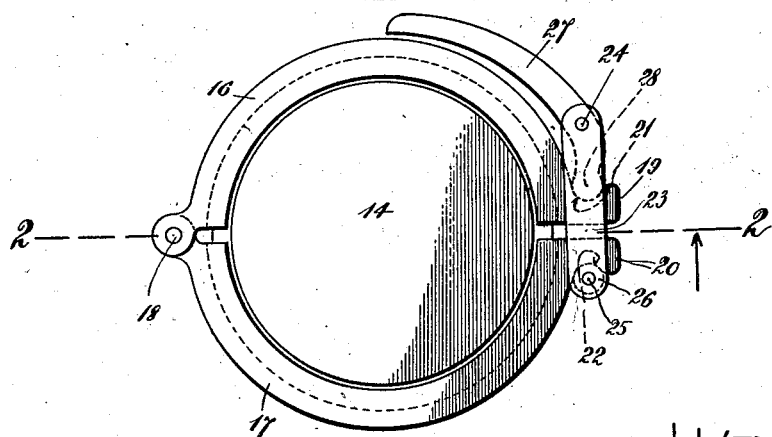
INVENTOR=
Harry Sumner Wright
By Geo. K. Woodworth
ATTORNEY=

Patented Apr. 18, 1933

1,904,340

UNITED STATES PATENT OFFICE

HARRY SUMNER WRIGHT, OF READING, MASSACHUSETTS

PIPE-TRAP COVER

Application filed December 5, 1931. Serial No. 579,182.

My invention relates to pipe-traps, cleanouts and the like, and more especially to covers or closures for the same.

Heretofore such traps which are made of lead have been closed by threaded caps, usually of brass, and on account of the sticking of the threads due to corrosion and other causes, the removal of such caps frequently resulted in the distortion of the body of the trap.

Sometimes, and especially in bathrooms, pipe-traps are placed beneath the floor, which usually is tiled, so that the replacement of a trap on account of injury to the same by the forcible removal of a screw-cap, necessitates the removal of a portion of the flooring and involves considerable expense.

The object of the present invention is to provide a closure for a trap or clean-out which may be quickly applied and removed without the slightest danger of sticking, as in the case of screw caps, and consequent injury to the device.

With this object in view my invention contemplates the use of a bevelled cover-plate disposed on the open end of the trap having a flange bevelled reversely to that of the cap, and a clamping member comprising two hinged arms, the inner surfaces of which are bevelled complementarily to those of the flange and cover, together with a locking member constructed and arranged to receive the laterally-projecting ends of said arms, and a lever pivotally connected to said member and arranged to co-operate with one of said projecting ends and draw the locking member against the other projecting end, thereby to tightly clamp the cover-plate to the trap.

In the drawing which accompanies and forms a part of this specification,

Figure 1 is a front elevation of a pipe trap embodying my invention;

Fig. 2 is a vertical section taken on the line 2—2 of Fig. 3, and

Fig. 3 is a plan view.

In the particular drawing selected for more fully disclosing the principle of my invention, 10 represents a pipe trap of the type usually placed under kitchen sinks, said trap having inlet pipes 11, 11 from the sink and wash-tubs, for example, and an outlet 12 to the soil pipe which is connected with the sewerage system.

The open end of the trap is provided with an annular bevelled flange 13 which may be of brass or other suitable material and preferably is secured to the trap by wiping. Placed on top of said flange is a cover-plate 14 having its edge bevelled reversely with respect to the bevel of the flange. Preferably a gasket 15 is interposed between the bevelled flange and the cover plate.

The means preferred by me for securing the cover to the trap for ready removal therefrom consists of an annular clamping member formed by two semi-circular arms 16, 17 hinged at 18 and terminating in laterally-extending projections 19, 20, respectively, said projections being, as shown, oppositely disposed and provided with oppositely-directed curvilinear surfaces 21, 22, respectively. A locking member 23 is provided for drawing the arms together, said locking member in the present instance consisting of two parallel plates connected by studs 24, 25, the stud 25 passing through a roller 26 shaped correspondingly with the curvilinear surface of the projecting end 20, and the stud 24 serving to pivotally connect the locking lever 27 to the upper end of the locking frame. The free end of said locking lever is provided with a cam surface 28 conforming in general to the shape of the curvilinear surface of the projecting end 19.

It will be noted that the locking member is independent of the clamping arms 16, 17 so that when the clamping member is loosened for removing the cover 14 by turning the lever to the right (referring to Fig. 3), said locking member with its attached locking lever may be removed from the ends of the clamping arms.

In order to clamp the cover-plate on the trap, the locking member is placed over the projections 19, 20 of the clamping arms, the lever 27 being in its righthand position, and said lever is then turned to the position shown in Fig. 3 so that by co-action of the cam surface on its free end with the curvilinear surface of the projection 19, the roll 26 is drawn against the projection 20 and the clamping member firmly closed on the flange 13 and cover 14, thereby locking the latter firmly in position.

Having thus described an illustrative embodiment of my invention, without however limiting the same thereto, what I claim and desire to secure by Letters Patent is:

A clamping member comprising a pair of hinged arms having their free ends terminating in oppositely-disposed laterally-extending projections provided with oppositely-directed curvilinear surfaces, a locking member independent of said arms and arranged to receive said projections, and a locking lever pivotally connected to one end of said member and having a cam surface on the free end thereof arranged for co-operation with the curvilinear surface of one of said projections to draw the other end of said member against the other of said projections.

In testimony whereof, I have hereunto subscribed my name this 4th day of December, 1931.

HARRY SUMNER WRIGHT.